March 2, 1954

C. D. BINTLIFF ET AL 2,670,484

LOADING PLATFORM

Filed Oct. 15, 1949

Chester D. Bintliff.
Eugene L. Attebery.
INVENTORS

BY

ATTORNEYS

March 2, 1954
C. D. BINTLIFF ET AL
2,670,484
LOADING PLATFORM
Filed Oct. 15, 1949
2 Sheets-Sheet 2
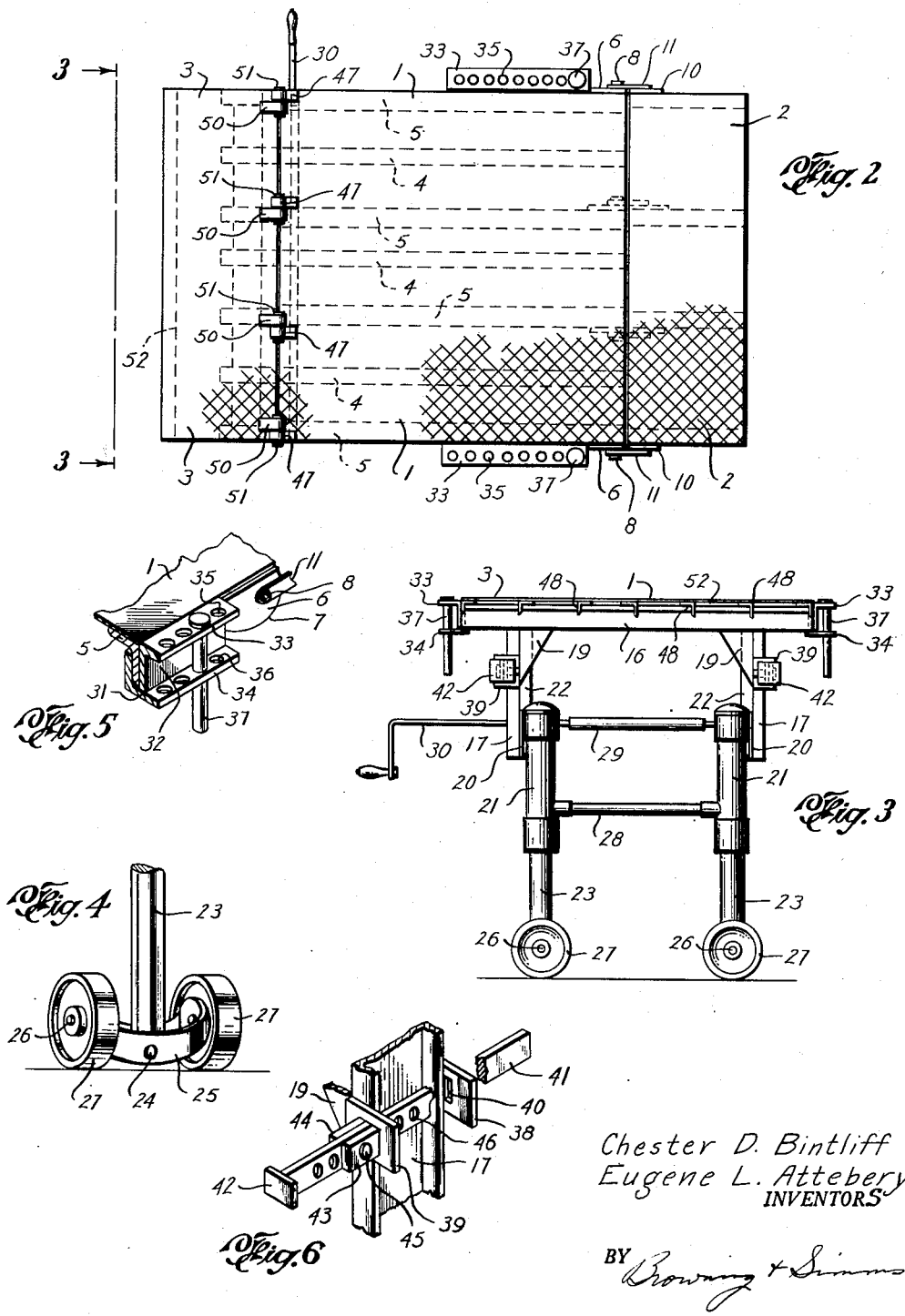
Chester D. Bintliff
Eugene L. Attebery
INVENTORS
BY
ATTORNEYS Patented Mar. 2, 1954

2,670,484

UNITED STATES PATENT OFFICE 2,670,484

LOADING PLATFORM

Chester D. Bintliff and Eugene L. Attebery, Houston, Tex., assignors, by direct and mesne assignments, to Gulf Canal Lines, Inc., Houston, Tex., a corporation of Texas Application October 15, 1949, Serial No. 121,532

3 Claims. (Cl. 14—72)

This application relates in general to loading platforms of the type sometimes referred to as gangplanks, and more particularly has reference to that type of loading platform adapted to bridge the space between a loading dock on the one hand and a carrier on the other hand so that goods may be moved from the loading dock to the carrier or vice versa either manually or by modern mechanical cargo handling devices with the least difficulty, and so that the loading platform may be moved readily and adapted to various positions and types of carrier. The general object of this invention is to provide a loading platform of the type referred to which will be inexpensive to manufacture yet which will be highly efficient and easy to handle and adjust to all of the varying conditions under which it may be required to operate.

This loading platform will be described and illustrated in its application to the situation in which it is to be used for the loading and unloading of trucks or similar vehicles from or to a stationary loading dock, although it will be appreciated that it would likewise be usable for loading or unloading other types of carriers as well.

In the description of the particular application of this invention which is disclosed in the drawings, reference will be had to the ground surface or like support and it will be understood that the surface that is intended to be referred to is not merely the natural surface of the ground but also any pavement or platform which might be provided at a position spaced somewhat from the loading edge of the loading dock and so disposed and of such strength as to support one end of the loading platform herein described.

More specifically, it is an object of this invention to provide a loading platform readily adaptable to loading or unloading carriers of various heights from or to a loading dock.

Another object of this invention is to provide such a loading platform which may be readily moved lengthwise of the loading edge of a dock to accommodate it to the position at which a carrier may be stopped for loading or unloading.

Another object is to provide such a loading platform which will not depend upon the carrier to support the platform in position, so that the platform can be kept in position with respect to the dock even when no carrier is present and so that the danger of dropping the loading platform upon accidental movement of the carrier will be eliminated.

Still another object of this invention is to provide a platform readily adaptable to loading or unloading carriers of various heights from or to a loading dock with an adjustable height supporting means having ground engaging parts readily movable with respect to the ground in a direction transversely of the platform but offering great resistance to movement longitudinally of the platform.

Yet another object of this invention is to provide a loading platform adapted to rest at one end on a loading dock and having an adjustable height ground engaging support at its opposite end which will resist movement away from or toward the loading dock yet facilitate movement parallel to the loading dock.

One other object of this invention is to provide a loading platform readily adaptable to loading or unloading carriers of various heights from or to a loading dock, with means for limiting the overlap of one end of the platform with respect to a loading dock and the approach of a carrier to the other end of the platform.

Another object of the invention is to provide a loading platform readily adaptable to loading or unloading carriers of various heights from or to a loading dock with means for limiting the overlap of one end of the platform with respect to a loading dock and the approach of a carrier to the other end of the platform, which means is adjustable to suit various conditions.

Other objects and advantages of this invention will become apparent from the following description taken in connection with the accompanying drawings wherein is set forth by way of illustration and example one embodiment of this invention. It will be understood that the following description and the accompanying drawings are by way of illustration and example only and are not to be taken by way of limitation.

In the drawing:

Figure 2 is a top plan view of a loading platform constructed in accordance with this invention.

Figure 3 is an end elevation of the loading platform shown in Figure 2, the same being along the line 3—3 of Figure 2.

Figure 4 is a fragmentary enlarged view illustrating the mounting of the lower end of one of the supporting legs of the loading platform, the same showing the parts in perspective.

Figure 5 is a fragmentary perspective view illustrating the manner of construction of the abutment adapted to engage the edge of a loading dock with which the platform is intended to cooperate.

Figure 6 is a view similar to Figure 5 but illustrating one of the abutments which is adapted to engage the edge of a carrier platform with which the loading platform is adapted to cooperate.

Figure 1:
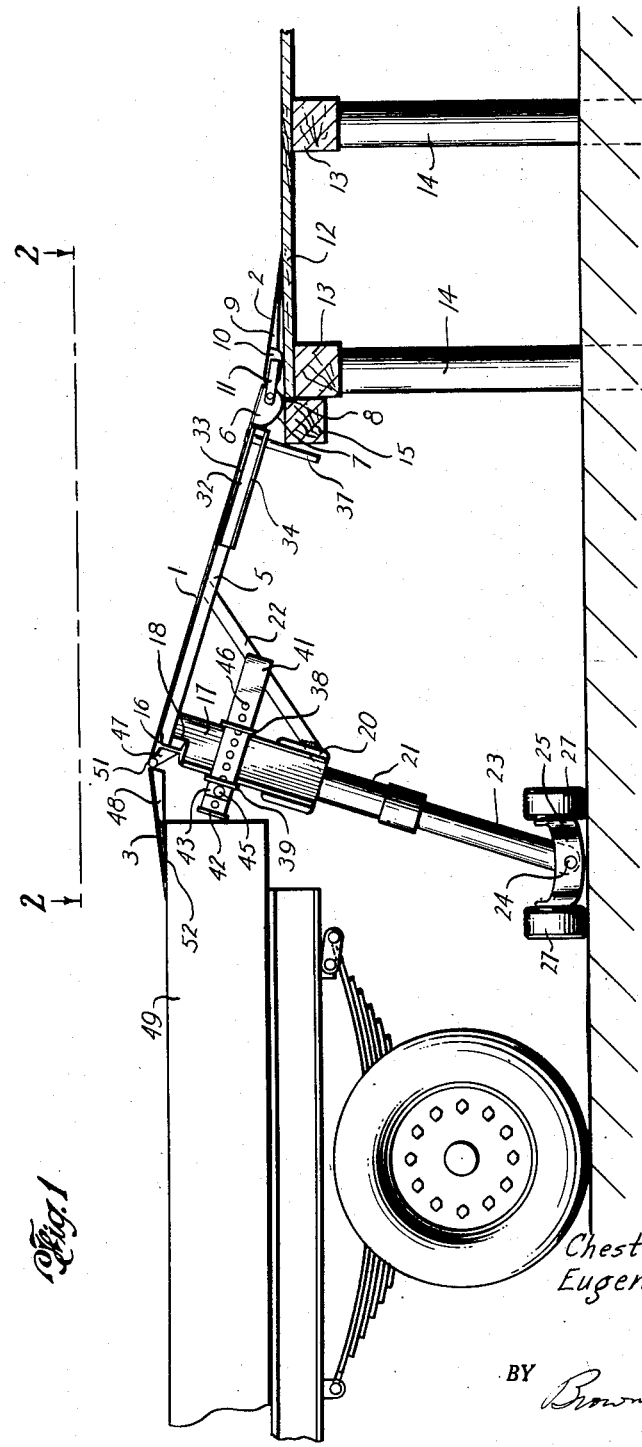
Figure 1 is a side elevation of a platform constructed in accordance with this invention in use bridging the space between a loading dock on the one hand and the rear end of a truck or trailer on the other hand.

Referring now more in detail to the drawings, the numeral 1 represents a floor member which may be of any suitable construction of sufficient strength, one such construction being in the form of a steel plate. Floor sections 2 and 3 are illustrated as being hinged to the opposite ends of the floor member 1 for the purpose of providing approaches from the loading dock and from the carrier platform, respectively, when this loading platform is in use.

The steel plate which forms the floor member 1 is preferably reinforced longitudinally thereof by means of spaced angle irons 4 and 5 extending longitudinally along the under surface of the plate and suitably welded or otherwise secured thereto. It is to be noted that the angle irons 4 are somewhat lighter than the angle irons 5 for the reason that the angle irons 5, as will presently be explained, serve as supports for the hinge connections for the floor sections 2 and 3.

For the purpose of providing a hinged connection for the floor section 2, each of the angle irons 5 has welded or otherwise suitably secured to its depending flange adjacent the end thereof to which the floor section 2 is to be hinged, a small hinge and rocker plate 6. This plate serves the dual purpose of providing a curved lower edge 7 adapted to rest upon the loading dock and support the adjacent end of the floor member 1, and also carries the pivot pin 8 forming a part of the hinge connection with the floor section 2.

The floor section 2 is reinforced on its under surface by wedge shaped portions of channel sections as indicated at 9, there being one of these for each of the angle irons 5, but each of the angle iron sections 9 being provided with a depending flange which is tapered to a wedge like shape toward the free edge of the floor section 2. To each of these depending flanges on the angle irons 9 adjacent that edge of the floor section 2 which is adapted to be hinged to the floor member 1, there is welded or otherwise suitably secured a small section of plate 10 which is preferably of the same thickness as the plate 6, and rigidly secured to the outer surface of this plate 10 is a hinge link 11 pivotally engaging with the pivot pin 8 on the plate 6. Thus, there is provided a multiple hinge connection between the floor member 1 and the floor section 2 so that the floor section 2 may assume a given angle with respect to the surface of the loading dock regardless of the angle at which the floor member 1 is disposed with respect to the floor surface of the loading dock.

The loading dock illustrated is shown as having a floor 12 mounted upon sills 13 which are in turn supported upon pilings or other upright supports 14. The edge of this dock which is adjacent the position at which the trucks or other carriers are to be stopped is provided with an abutment rail or beam 15 in a customary fashion, the upper edge of this rail 15 being preferably substantially on a level with the floor 12.

Substantially at its opposite end from the loading dock, the loading platform of this invention is provided with a transverse beam 16 providing a rigid cross member secured to and supporting the ends of each of the angle irons 4 and 5. The beam 16, which is shown as an I-beam, is in turn supported by means of spaced depending channel members 17 welded or otherwise secured at their upper ends to spaced points on the beam 16 and preferably also to depending flanges of two of the angle irons 4, the web and one flange of the channel member 17 being cut away as shown at 18 to fit around the I-beam 16. Each of these channel members is further braced with respect to the I-beam 16 by means of triangular shaped webs 19 welded or otherwise suitably secured in the angles between the I-beam 16 and the respective channel shaped members 17.

Welded or otherwise secured to the inner face of each of the channel shaped members adjacent its lower end is a flat securing plate 20 carried by the upper end of a cylinder 21 forming part of a hydraulic jack. Cylinder 21 is thus made integral with and rigidly connected to the channel shaped support member 17, and these two are still further braced with respect to the floor member 1 by means of a strut 22 which is secured to the upper end of the cylinder 21 at one of its ends and to an intermediate point on one of the angle irons 4 at the other of its ends.

Adapted for reciprocation within the cylinder 21 is a plunger 23 which extends downwardly from the lower end of the cylinder 21 and at its lower extremity is provided with a pivotal connection 24 upon a cradle or frame 25. The cradle or frame 25 at its opposite ends has axles 26 on which are carried respectively a pair of wheels 27. The axles 26 will be seen to be located in a plane at substantially right angles to the face of the loading dock 12 and substantially parallel to the longitudinal edges of the floor member 1 while the pivot 24 will be seen to be substantially normal to the longitudinal edges of the floor member 1 and approximately parallel to the edge of the loading dock. The wheels 27 are preferably provided with treads of a non-skid type so that while these wheels may roll freely upon the ground or other supporting surface, they will offer great resistance to sliding in a direction longitudinally of their axes.

The cylinders 21 may be braced with respect to each other in any suitable fashion such as by means of the cross brace 28, and the hydraulic mechanism of the jacks provided by the cylinders 21 and plungers 23 are adapted to be actuated simultaneously through the medium of a coupling 29 extending between them and a crank 30 or other means of applying power to actuate the jacks. It will be understood that the specific construction of these jacks forms no part of this invention, it being sufficient that jacks be provided which are of such a nature that they may cause the supports for the loading dock to be extended or retracted either manually or by some other suitable source of power, and that the jacks need not be hydraulic.

For the purpose of providing a stop or abutment to prevent the floor member 1 from overlapping or overlying the loading dock to too great an extent, there are provided two angle irons 31 and 32, respectively, each having a flange disposed next to the vertical flange of one of the outside angle irons 5, the vertical flange of the angle iron 31 being disposed on the inside of the flange of the angle iron 5 and the vertical flange of the angle iron 32 being disposed on the outside thereof, so that the two horizontal flanges of the angle irons 31 and 32 will lie parallel to each other, the horizontal flange 33 of the angle iron 32 being adjacent the plane of the floor member 1, and the horizontal flange 34 of the angle iron 31 being spaced somewhat below the flange 33. Both flanges are secured to the angle iron 5 at a position adjacent to the plate 6 and the respective flanges 33 and 34 are provided with registering holes 35 and 36, respectively, there being a number of these holes provided at varying distances from the end of the floor member 1, and each pair of registering holes 35 and 36 being adapted to receive an abutment pin 37. Thus, it will be seen that the abutment pins 37 on the opposite sides of the floor member 1 may be placed in any desired registering pair of holes 35 and 36 so as to adjust the distance from the abutment pin 37 to the end of the floor member 1. The abutment pin 37 in each case will depend from the floor member 1 a sufficient distance to engage the rail 15 and thereby to limit the extent to which the floor member 1 will overlie the loading dock.

An adjustable abutment or stop is likewise provided at the opposite end of the floor member 1 on each of the channel members 17. For the purpose of mounting this abutment there are welded to the opposite flanges of the channel members 17 brackets 38 and 39, respectively. The bracket 38 is perforated at 40, and the bracket 39 is correspondingly perforated to receive a bar 41 having an abutment plate 42 on its end which projects beyond the end of the floor member 1. The bracket 39 has a pair of lugs or ears 43 and 44, respectively, extending outwardly from each side of the opening through this bracket, these lugs or ears being formed integral with the bracket and being provided with registering openings adapted to receive a pin 45. The bar 41 is likewise provided with a series of perforations 46 adapted to receive the pin 45. Thus the position of the bar 41 and of the abutment plate 42 may be adjusted by moving the bar 41 through the openings 40 in the brackets 38 and 39 until the desired position is reached and then inserting the pin 45 through the openings in the lugs 43 and 44 and a selected opening 46 in the bar 41.

It will be seen that the abutment plates 42 will always project more or less beyond the end of the floor member 1 and that it will, therefore, be necessary that a means be provided for bridging between the end of this floor member 1 and the platform of a truck, trailer or other carrier with which this invention is adapted to cooperate. The hinged floor section 3 accomplishes this purpose, and for the purpose of hinging this section to the floor member 1, the floor member is provided with spaced hinge brackets 47, one of such brackets being located adjacent each of the angle irons 5 and being welded or otherwise suitably secured to the floor member 1. The floor section 3 is in its turn provided with angle irons 48, which are tapered toward the free edge of the floor section so as to permit the free edge of the floor section to lie close to the floor of the truck 49, or the like, there being one of these angle irons 48 for each of the angle irons 4 and 5 of the main floor member 1, and the angle irons 48 being preferably in alignment with the corresponding angle irons 4 and 5 of the floor member 1.

Welded or otherwise secured to the floor section 3 are hinge brackets 50 which are adapted to cooperate with the hinge brackets 47 and to receive hinge pins 51 to complete the pivotal connection between the floor section 3 and the floor member 1.

For the purpose of reinforcing the floor section 3 between the ends of the tapered angle irons 48 and the free edge of the floor section, there may be welded or secured in some suitable manner to the under surface of the floor plate of the floor section 3 a reinforcing plate 52, which preferably extends from a position closely adjacent the free edge of the floor section 3 to a position slightly overlapping the ends of the angle irons 48.

While wheeled supports are shown on one end of the platform only, and approach sections or aprons are shown on two opposite ends only, it will be understood that this invention does not preclude the use of additional wheeled supports and aprons.

From the foregoing it will be seen that a loading platform has been provided which accomplishes all of the objects and advantages sought by this invention.

The invention having been described, what is claimed is:

1. A portable loading platform which comprises, in combination, a rigid floor member adapted to bridge the space between a loading dock and a carrier, means for supporting the carrier end of the floor member from the ground or like surface comprising rolling support means having rollers disposed with their rotational axes transverse to the carrier end of the floor member, an end frame rigidly secured to the under side of the carrier end of the floor member, and a jack rigidly connected at its upper end to the end frame and pivotally connected at its lower end to the rolling support means, the entire structure comprising the jack, the end frame and the floor member being tiltable about the pivot supporting the lower end of the jack whereby the dock end of the floor member may be raised or lowered, an abutment member depending from the dock end of the floor member and adapted to engage the dock, the adjacent end of the floor member projecting beyond the abutment member, and an abutment member carried by the end frame and adapted to engage the carrier platform, the last mentioned abutment member projecting beyond the adjacent end of the floor member, and a floor member approach section hinged to the carrier end of the floor member.

2. A portable loading platform which comprises, in combination, a rigid floor member adapted to bridge the space between a loading dock and a carrier, means for supporting the carrier end of the floor member from the ground or like surface comprising rolling support means having rollers disposed with their rotational axes transverse to the carrier end of the floor member, an end frame rigidly secured to the under side of the carrier end of the floor member, and a jack rigidly connected at its upper end to the end frame and pivotally connected at its lower end to the rolling support means, the entire structure comprising the jack, the end frame and the floor member being tiltable about the pivot supporting the lower end of the jack whereby the dock end of the floor member may be raised or lowered, an abutment member depending from the dock end of the floor member and adapted to engage the dock, the adjacent end of the floor member projecting beyond the abutment member, and an abutment member carried by the end frame and adapted to engage the carrier platform, the last mentioned abutment member projecting beyond the adjacent end of the floor member, a floor member approach section hinged to the carrier end of the floor member, and a second floor member approach section hinged to the dock end of the floor member.

3. A portable loading platform which comprises, in combination, a rigid floor member adapted to bridge the space between a loading dock and a carrier, means for supporting the carrier end of the floor member from the ground or like surface comprising rolling support means having rollers disposed with their rotational axes transverse to the carrier end of the floor member, an end frame rigidly secured to the under side of the carrier end of the floor member, the end frame including a transverse floor supporting beam and a pair of elongated, vertically disposed side members rigidly connected at their upper ends to the floor supporting beam, the structure being additionally reinforced by braces connecting the lower ends of the side members to the floor member at points intermediate its ends, and a pair of jacks each rigidly connected at its upper end to the lower end of one of the side members and pivotally connected at its lower end to the rolling support means, the entire structure comprising the jacks, the end frame and the floor member being tiltable about the pivots supporting the lower ends of the jacks whereby the dock end of the floor member may be raised or lowered, a pair of abutment members depending from the sides of the dock end of the floor member and adapted to engage the dock, the adjacent end of the floor member projecting beyond the abutment members, and a pair of abutment members carried by the side members and adapted to engage the carrier platform, the last mentioned abutment members projecting beyond the adjacent end of the floor member, a floor member approach section hinged to the carrier end of the floor member, and a second floor member approach section hinged to the dock end of the floor member.

CHESTER D. BINTLIFF.
EUGENE L. ATTEBERY.

References Cited in the file of this patent

UNITED STATES PATENTS

| Number | Name | Date |
|---|---|---|
| 2,284,022 | Schmeller | May 26, 1942 |
| 2,424,876 | Butler | July 29, 1947 |
| 2,449,829 | Agren | Sept. 21, 1948 |
| 2,461,678 | Christensen | Feb. 15, 1949 |
| 2,521,349 | Diamond | Sept. 5, 1950 |
| 2,560,064 | Astry | July 10, 1951 |